United States Patent
Heilemann et al.

(10) Patent No.: US 11,463,804 B2
(45) Date of Patent: Oct. 4, 2022

(54) PANEL LOUDSPEAKERS CONSTRUCTED OF PANELS WITH VISCOELASTIC DAMPING MATERIAL

(71) Applicant: The University of Rochester, Rochester, NY (US)

(72) Inventors: Michael Charles Heilemann, Rochester, NY (US); Mark Frederick Bocko, Caledonia, NY (US); David Allan Anderson, Rochester, NY (US)

(73) Assignee: THE UNIVERSITY OF ROCHESTER, Rochester, NY (US)

( * ) Notice: Subject to any disclaimer, the term of this patent is extended or adjusted under 35 U.S.C. 154(b) by 0 days.

(21) Appl. No.: 16/592,357

(22) Filed: Oct. 3, 2019

(65) Prior Publication Data

US 2020/0120414 A1 Apr. 16, 2020

Related U.S. Application Data

(60) Provisional application No. 62/745,314, filed on Oct. 13, 2018.

(51) Int. Cl.
| | | |
|---|---|---|
| *H04R 1/28* | (2006.01) | |
| *B32B 7/12* | (2006.01) | |
| *B32B 37/12* | (2006.01) | |
| *B32B 37/18* | (2006.01) | |
| *H04R 17/00* | (2006.01) | |
| *H04R 31/00* | (2006.01) | |
| *H04R 7/04* | (2006.01) | |

(52) U.S. Cl.
CPC .............. *H04R 1/288* (2013.01); *B32B 7/12* (2013.01); *B32B 37/12* (2013.01); *B32B 37/18* (2013.01); *H04R 7/045* (2013.01); *H04R 17/00* (2013.01); *H04R 31/003* (2013.01); *B32B 2305/34* (2013.01); *B32B 2307/10* (2013.01); *B32B 2307/20* (2013.01); *B32B 2457/00* (2013.01)

(58) Field of Classification Search
CPC ........ H04R 1/288; H04R 17/00; H04R 7/045; H04R 2440/01; H04R 2440/05; B32B 7/12; B32B 37/12; B32B 37/18; B32B 2307/20; B32B 2305/34; B32B 2307/10; B32B 2457/00; B32B 2250/40; B32B 2250/42
See application file for complete search history.

(56) References Cited

U.S. PATENT DOCUMENTS 5,474,840 A * 12/1995 Landin .................... B32B 15/06
428/450
2015/0086048 A1* 3/2015 Brown ............... B32B 17/10743
381/152

* cited by examiner

Primary Examiner — Tuan D Nguyen
(74) Attorney, Agent, or Firm — Ping Wang; Rimon Law (57) ABSTRACT

A loudspeaker system with viscoelastic material affixed between two flexible panels is disclosed. The loudspeaker system dissipates the energy of motion, resulting in less pronounced resonant peaks. The effect may be especially evident at high frequencies, where energy is dissipated over many cycles in a shorter period of time. Also disclosed are the method of making the loudspeaker system and a method of using the loudspeaker system.

13 Claims, 5 Drawing Sheets

PANEL LOUDSPEAKERS CONSTRUCTED OF PANELS WITH VISCOELASTIC DAMPING MATERIAL

This application claims priority to U.S. Provisional Application Ser. No. 62/745,314, filed on Oct. 13, 2018. The entirety of the aforementioned application is incorporated herein by reference.

FIELD

The present application relates generally to panel loudspeakers and, in particular, panel loudspeakers with a viscoelastic damping material located between two or more panels.

BACKGROUND

Panel loudspeakers are used in a number of applications, including mobile devices such as smart phones. Panel loudspeakers are used in smaller devices where conventional speakers are not practical.

Figure 1:
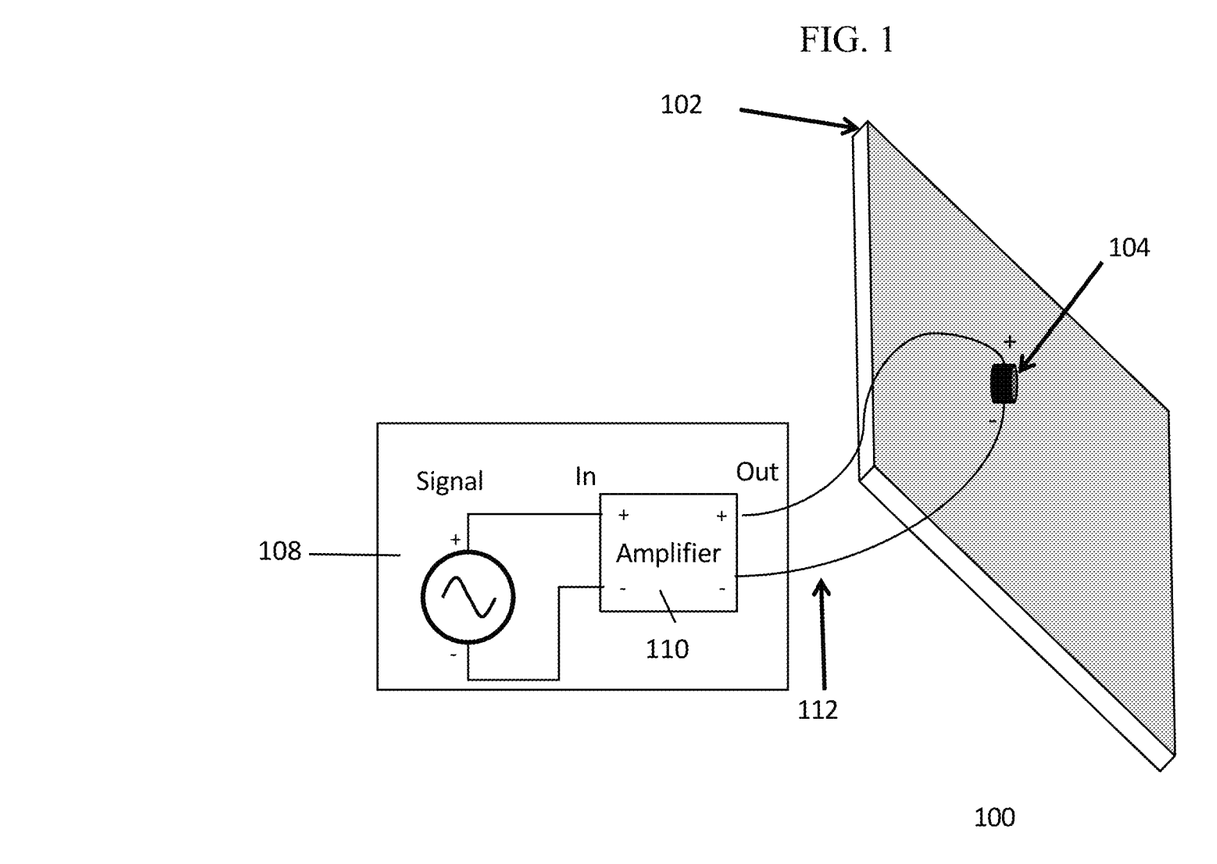
FIG. 1 is a conventional panel speaker system.

FIG. 1 is a conventional panel loudspeaker system 100. The flat panel speaker system 100 includes a flexible panel 102 with a force actuator 104 affixed to it. The force actuator 104 is driven by a signal from signal output module 106. Signal output module 106 comprises a signal generator 108 that generates the signal. An amplifier 110 amplifies the signal to output from the signal output module 106. The signal output module 106 is connected to the force actuator 104, such as by wires 112.

When a signal is applied to the force actuator 104, via an amplifier 110, the force actuator 104 induces a bending motion in the flexible panel 102, which radiates sound. Depending on the boundary conditions, panel dimensions, and panel material, the vibrations induced in a panel-form loudspeaker may build up standing wave patterns, or resonant modes at various frequencies throughout the audible frequency bandwidth (20 Hz-20 kHz). These resonances amplify the net acceleration of the panel at the resonant frequencies. The total radiated sound pressure is proportional to the net acceleration integrated over the entire surface area, so each resonant peak increases the sound radiation intensity at frequencies near the resonance thereby "coloring" the reproduced audio. The resonant modes also have their own unique spatial vibration responses, which may cause acoustic phase cancellations at different points in the listening space, to create a spatially non-uniform sound field in the listening space.

Conventional panel loudspeaker system 100 may utilize a multitude of panel bending modes to produce sound. However, these modes cause the sound field produced by the loudspeaker to exhibit high variability in both the frequency response and directivity, thus degrading audio quality.

Therefore, there is an existing need for a loudspeaker system that reduces the variability in both the frequency response and directivity, and thus provides improved audio quality.

SUMMARY

One aspect of the present application relates to a loudspeaker that comprises: a first elastic panel, a second elastic panel, a first layer of a first viscoelastic material affixed between the first elastic panel and the second elastic panel to form a combined panel, and at least one force actuator located at a surface of the first elastic panel, wherein, in response to an input signal, the at least one force actuator is driven to induce a bending motion in the combined panel to generate sound.

In another aspect of the present application, a method of making a loudspeaker comprises: providing a first elastic panel and a second elastic panel; adhering the first elastic panel to the second elastic panel using a first layer of a first viscoelastic material to form a combined panel; and locating at least one force actuator at a surface of the first elastic panel; wherein, in response to an input signal, the at least one force actuator is driven to induce a bending motion in the combined panel to generate sound.

In a further aspect of the present application, a method for using a loudspeaker comprises: applying an input signal to at least one force actuator affixed to a surface of a combined panel, the combined panel comprising: a first elastic panel; a second elastic panel; and a first layer of a first viscoelastic material affixed between the first elastic panel and the second elastic panel; and wherein the at least one force actuator is located at a surface of the first elastic panel; and wherein, in response to an input signal, the at least one force actuator is driven to induce a bending motion in the combined panel to generate sound.

Further objectives, features and advantages of the invention will be apparent from the following detailed description taken in conjunction with the accompanying drawings.

BRIEF DESCRIPTION OF THE DRAWINGS

For the purposes of this disclosure, unless otherwise indicated, identical reference numerals used in different figures refer to the same component.

DETAILED DESCRIPTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. The present invention is not intended to be limited to the embodiments shown, but is to be accorded the broadest possible scope consistent with the principles and features disclosed herein.

One aspect of the present application relates to a loudspeaker that comprises: a first elastic panel, a second elastic panel, a first layer of a first viscoelastic material affixed between the first elastic panel and the second elastic panel to form a combined panel, and at least one force actuator located at a surface of the first elastic panel, wherein, in response to an input signal, the at least one force actuator is driven to induce a bending motion in the combined panel to generate sound. In certain embodiments, the panel is flat. In certain embodiments, the panel is curved.

In some embodiments, the viscoelastic material is positioned in a prescribed sub region of the first elastic panel to dampen the response of a specific bending mode of the combined panel. In a further embodiment, the prescribed sub region is a region of high curvature for the specific bending mode to be damped.

In another embodiment, the combined panel comprises N elastic panels and N−1 layers of viscoelastic materials, where N is a natural number greater than or equal to 2, and wherein the N elastic panels and the N−1 layers are arranged to be alternating.

In another embodiment, the first viscoelastic material is bonded to an entire surface of the first elastic panel and an entire surface of the second elastic panel.

In another embodiment, the first layer of viscoelastic material does not occupy the entire space between the first elastic panel and the second elastic panel.

In still another embodiment, the loudspeaker further comprises: a second layer of a second viscoelastic material; wherein the first layer of the first viscoelastic material is affixed between a first section of the first elastic panel and a first section of the second elastic panel, and the second layer of the second viscoelastic material is affixed between a second section of the first elastic panel and a second section of the second elastic panel.

In another embodiment, an acoustic radiating surface of the first elastic panel is covered by a constrained viscoelastic material.

In another embodiment, the input signal comprises one of a digital signal, an analog signal, a partially digital, and a partially analog signal. In still another embodiment, the input signal comprises an audio signal.

In another embodiment, the sound is one or more of speech, music, naturally occurring sound and synthesized sound.

In another embodiment, the first elastic panel and the second elastic panel each comprise a material selected from the group including expanded polyvinyl chloride, glass, foam board, plastic, structural organic polymer, cardboard, wood, wood composite, aluminum, metal and alloy.

In still another embodiment, the viscoelastic material comprises an adhesive material with viscoelastic properties. In another embodiment, the viscoelastic material comprises an acrylic monomer.

In another embodiment, the at least one force actuator comprises an electromagnetic coil driver. In another embodiment, the at least one force actuator is formed of one of a crystalline piezoelectric material and an organic polymer piezoelectric material.

In another aspect of the present application, a method of making a loudspeaker comprises: providing a first elastic panel and a second elastic panel; adhering the first elastic panel to the second elastic panel using a first layer of a first viscoelastic material to form a combined panel; and locating at least one force actuator at a surface of the first elastic panel; wherein, in response to an input signal, the at least one force actuator is driven to induce a bending motion in the combined panel to generate sound.

In another embodiment, the viscoelastic material is positioned in a prescribed sub region of the first elastic panel to dampen the response of a specific bending mode of the combined panel. In another embodiment, the prescribed sub region is a region of high curvature for the specific bending mode to be damped.

In another embodiment, the method further comprises providing N elastic panels and a N−1 layers of viscoelastic materials, where N is a natural number greater than or equal to 2, and wherein the N elastic panels and the N−1 layers are arranged to be alternating.

In still another embodiment, the first viscoelastic material is bonded to an entire surface of the first elastic panel and an entire surface of the second elastic panel.

In another embodiment, the first layer of viscoelastic material does not occupy the entire space between the first elastic panel and the second elastic panel.

In another embodiment, the method further comprises: providing a second layer of a second viscoelastic material; applying the first layer of the first viscoelastic material between a first section of the first elastic panel and a first section of the second elastic panel; and applying the second layer of the second viscoelastic material between a second section of the first elastic panel and a second section of the second elastic panel.

In still another embodiment, the method comprises: providing a constrained viscoelastic material; and covering at least a portion of a radiating surface of the first elastic panel with the constrained viscoelastic material.

In another embodiment, the first elastic panel and the second elastic panel each comprise a material selected from the group including of expanded polyvinyl chloride, glass, foam board, plastic, structural organic polymer, cardboard, wood, wood composite, aluminum, metal, and alloy.

In another embodiment, the viscoelastic material comprises an adhesive material with viscoelastic properties. In another embodiment, the viscoelastic material comprises an acrylic monomer.

In still another embodiment, the at least one force actuator comprises an electromagnetic coil driver.

In another embodiment, the at least one force actuator is formed of one of a crystalline piezoelectric material and an organic polymer piezoelectric material.

In a further aspect of the present application, a method for using a loudspeaker comprises: applying an input signal to at least one force actuator affixed to a surface of a combined panel, the combined panel comprising: a first elastic panel; a second elastic panel; and a first layer of a first viscoelastic material affixed between the first elastic panel and the second elastic panel; and wherein the at least one force actuator is located at a surface of the first elastic panel; and wherein, in response to an input signal, the at least one force actuator is driven to induce a bending motion in the combined panel to generate sound.

In another embodiment, the viscoelastic material is positioned in a prescribed sub region of the first elastic panel to dampen the response of a specific bending mode of the combined panel. In another embodiment, the prescribed sub region is a region of high curvature for the specific bending mode to be damped.

In another embodiment, the combined panel comprises N elastic panels and N−1 layers of viscoelastic materials, wherein N is a natural number, and wherein the N elastic panels and the N−1 layers are arranged to be alternating.

In still another embodiment, the first viscoelastic material is bonded to an entire surface of the first elastic panel and an entire surface of the second elastic panel.

In another embodiment, the first layer of viscoelastic material does not occupy the entire space between the first elastic panel and the second elastic panel.

In another embodiment, the combined panel further comprises: a second layer of a second viscoelastic material; wherein the first layer of the first viscoelastic material is affixed between a first section of the first elastic panel and a first section of the second elastic panel, and the second layer of the second viscoelastic material is affixed between a second section of the first elastic panel and a second section of the second elastic panel. In certain embodiments, the panel is flat. In certain embodiments, the panel is curved.

In another embodiment, an acoustic radiating surface of the first elastic panel is covered by a constrained viscoelastic material.

In another embodiment, the input signal comprises one of a digital signal, an analog signal, a partially digital signal, and a partially analog signal.

In still another embodiment, the input signal comprises an audio signal.

In another embodiment, the sound is one or more of speech, music, a naturally occurring sound and a synthesized sound.

In another embodiment, the first elastic panel and the second elastic panel each comprise a material selected from the group including of expanded polyvinyl chloride, glass, foam board, plastic, structural organic polymer, cardboard, wood, wood composite, aluminum, metal, and alloy.

In still another embodiment, the viscoelastic material comprises an adhesive material with viscoelastic properties. In another embodiment, the viscoelastic material comprises an acrylic monomer.

In another embodiment, the at least one force actuator comprises an electromagnetic coil driver.

In another embodiment, the at least one force actuator is formed of one of a crystalline piezoelectric material and an organic polymer piezoelectric material.

Panel Loudspeaker with Viscoelastic Material

Figure 2:
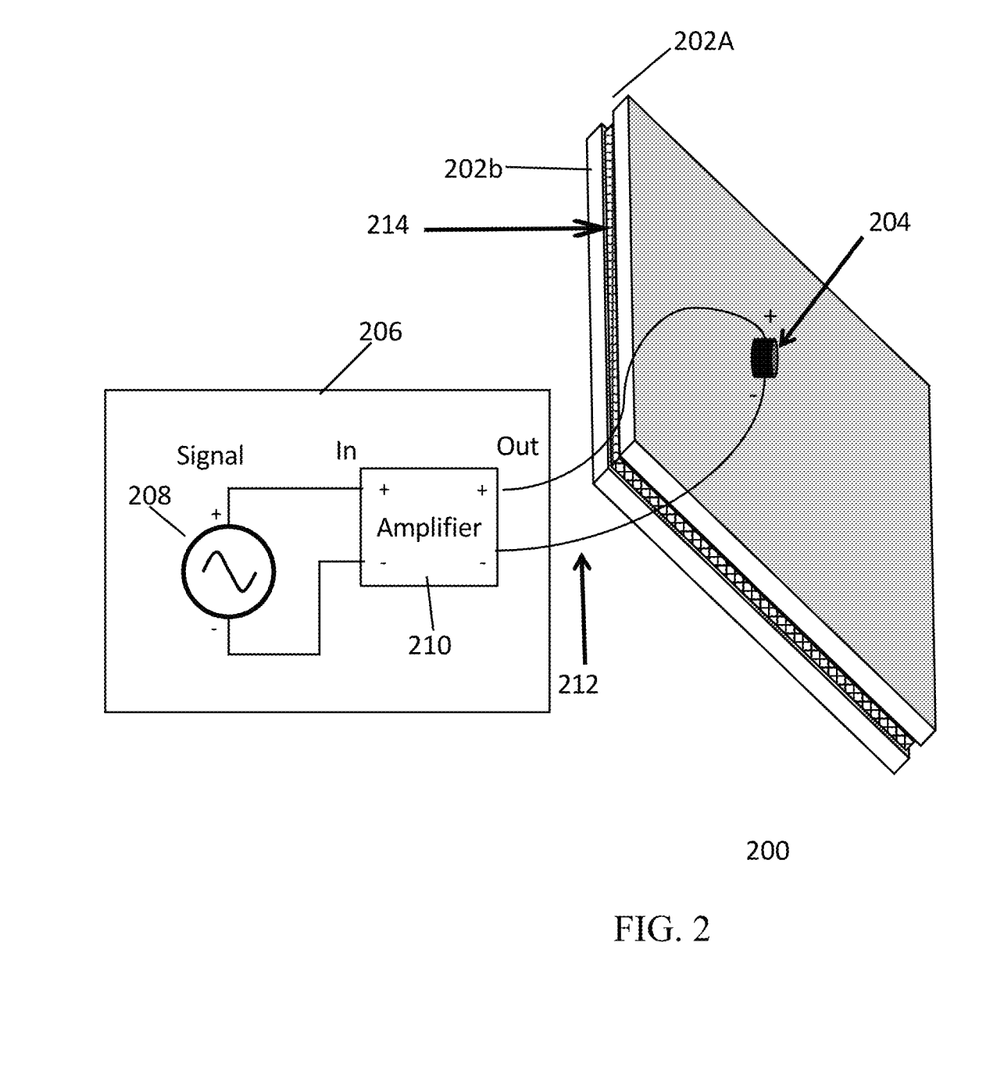
FIG. 2 is a panel loudspeaker system with two elastic panels and a layer of viscoelastic material of the present application.

FIG. 2 is a panel loudspeaker system 200 with two flexible panels and a layer of viscoelastic material of the present application. Panel loudspeaker 200 includes a viscoelastic layer 214 located between flexible panel 202a and flexible panel 202b. The viscoelastic layer 214 may be located in between in that it is in direct contact with both flexible panel 202a and flexible panel 202b. The system 200 further includes a force actuator 204 located at a surface of flexible panel 202a, such as, for example, attached to the surface of flexible panel 202a. The force actuator 204 is driven by a signal from signal output module 206. Signal output module 206 comprises a signal generator 208 that generates the signal. An amplifier 210 amplifies the signal to output it from the signal output module 206. The signal output module 206 is connected to the force actuator 204, such as by wires 212.

The loudspeaker may be a multilayered panel, where flexible panel 202a and flexible panel 202b are bonded together with a layer of viscoelastic material 214. As the panel vibrates, the viscoelastic material layer 214 between the flexible panel 202a and flexible panel 202b dissipates the energy of motion, resulting in less pronounced resonant peaks. The effect may be especially evident at high frequencies, where energy is dissipated over many cycles in a shorter period of time.

The viscoelastic material layer 214 may be directly attached to the flexible panel 202a and flexible panel 202b. In such an example, the viscoelastic material 214 may have adhesive properties that allow direct attachment to flexible panel 202a and flexible panel 202b. Alternatively, the viscoelastic material layer 214 may be attached to flexible panels 202a and 202b by way of one or more other materials. In this example, the other materials (not pictured) may have adhesive properties that permit the viscoelastic material 214 to be securely located between the flexible panel 202a and flexible panel 202b. These adhesives may include any conventional adhesive.

The force actuator 204 may be located on or near a flexible panel 202a such that activating the force actuator 204 induces a bending in the flexible panel 202a. Although one force actuator 204 is shown, a plurality of force actuators may be used and placed in various positions to increase or reduce various properties of the loudspeaker. For example, multiple force actuators may be placed so as to alter the vibrations induced in a loudspeaker, and in turn altering any standing wave patterns, or resonant modes at various frequencies throughout the audible frequency bandwidth (20 Hz-20 kHz). The plurality of force actuators may be driven by a single signal output module 206 or a plurality of signal output modules 206.

In addition, one or more force actuators 206 may be placed at flexible panel 202b instead of, or in addition to, being placed at flexible panel 202a. For example, a force actuator 206 may be placed at flexible panel 202a while another force actuator 206 may be placed at flexible panel 202b. Other configurations of the locations of force actuators may also be used.

The loudspeakers of the application may be made using various types of materials. The flexible panel 202a and flexible panel 202b may be made of the same material or different materials. The materials used in the flexible panel 202a and flexible panel 202b, as well as other flexible panels described herein, may be made of a flexible material that flexes upon force actuator 206 making contact. Flexible materials may include expanded polyvinyl chloride, polyimide, polyester, polyvinylidene difluoride, polypropylene, polycarbonate, polyvinylidene fluoride, graphene, carbon, carbon nano-tubes, glass, foam board, plastic, structural organic polymer, cardboard, wood, wood composite, aluminum, beryllium, metal alloy, and combinations thereof. Other types of materials may also be used.

The viscoelastic material 214, as well as other viscoelastic materials described herein, may be of an adhesive material with viscoelastic properties. The viscoelastic material may be an acrylic monomer, elastomer, rubber, rubber-asphalt, amorphous polymers, semicrystalline polymers, biopolymers, foam and combinations thereof. Other types of materials may also be used.

The force actuator 204 may be a device that applies a force to the flexible panel 202a and/or flexible panel 202b. The force may be applied in a manner that causes the flexible panel 202a and/or flexible panel 202b to flex and/or vibrate, thereby producing sounds at various frequencies throughout the audible frequency bandwidth (20 Hz-20 kHz). The force actuator 204, as well as other force actuators described herein, may be electromagnetic coil driver, a moving coil actuator, a moving magnet actuator, a moving iron actuator, a voice coil actuator, a bi-stable linear moving magnet, a magnetostrictive actuator, or a magneto rheological fluid actuator. The force actuator 204 may also be formed of a crystalline piezoelectric material, a semi-crystalline piezoelectric or an organic polymer piezoelectric material. The force actuator 204 may also be formed of quartz, berlinite, sucrose, Rochelle salt, topaz, lead titanate, tourmaline-group minerals, langasite, gallium orthophosphate, lithium niobate, lithium tantalite, barium titanate, lead zirconate titanate, potassium niobate, sodium tungstate, zinc oxide, ceramic lead zirconate titanate, sodium potassium niobate, bismuth ferrite, sodium niobate, barium titanate, bismuth titanate, or sodium bismuth titanate. The force actuator 204 may also be formed of polyvinylidene fluoride (PVDF), polyamides, paralyne-C, a polyimide, or polyvinylidene chloride (PVDC). Other types of materials and force actuators may also be used.

FIG. 2 illustrates a loudspeaker with a layer of one type of viscoelastic material 214 between flexible panel 202a and flexible panel 202b. However, two or more types of viscoelastic materials 214 may be placed between flexible panel 202a and flexible panel 202b. For example, one type of viscoelastic material 214 may be place between a first position of flexible panel 202a and a first position of flexible panel 202b, while another type of viscoelastic material 214 may be place between a second position of flexible panel 202a and a second position of flexible panel 202b. Additional types of viscoelastic material 214 may be placed at other positions between type of viscoelastic material 214 may be place between a first position of flexible panel 202a and a first position of flexible panel 202b. The different types of viscoelastic materials 214 may be positioned to increase or reduce various qualities of the loudspeaker system 200.

In addition, two or more types of viscoelastic material 214 may be placed between flexible panel 202a and flexible panel 202b such that each of the types of viscoelastic material 214 covers all or substantially all of flexible panel 202a and flexible panel 202b. In this example, there may be more two or more types of viscoelastic material 214 that provide dampening of the vibrations of flexible panel 202a and/or flexible panel 202b.

Figure 3:
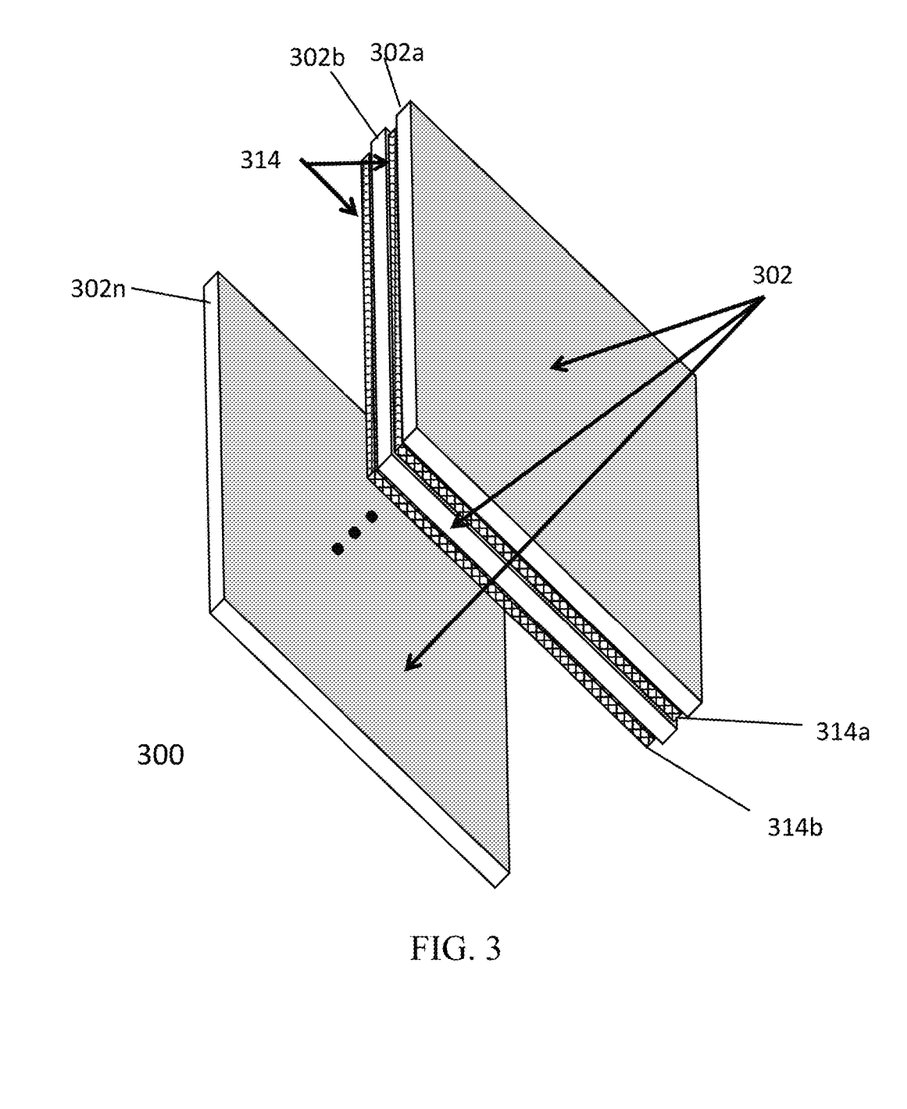
FIG. 3 is a panel loudspeaker system with multiple elastic panels and multiple layers of viscoelastic material of the present application.

FIG. 3 is a loudspeaker system with multiple flexible panels and multiple layers of viscoelastic material of the present application. The loudspeaker system 300 has a plurality of flexible panels 302a, 302b, . . . 302n and a plurality of viscoelastic material layers 314a, 314b, 314n-1, where n is a natural number and there is one less viscoelastic layer than there are flexible panels. The flexible panels 302 and viscoelastic material layers 314 are arranged so that each viscoelastic material layer 314 is located between two flexible panels 302. This arrangement may lead to a stacked configuration, where the flexible panels 302 and the viscoelastic material layers 314 are in an alternating arrangement.

The loudspeaker system 300 may include the flexible panels 302a, 302b, . . . 302n of the same material and the viscoelastic material layers 314a, 314b, 314n-1 of the same material. Alternatively, the flexible panels 302a, 302b, . . . 302n may be made of different materials, and the viscoelastic material layers 314a, 314b, 314n-1 may be made of different materials. This may include various arrangements, such as some flexible panels being made of the same material while others are not, some of the viscoelastic materials being made of the same material while others are not, the flexible panels being made of the same material while the viscoelastic materials are different and the flexible panels being made of different materials while the viscoelastic materials are made of the same material. Other configurations may also be used.

In addition, one or more force actuators 306 may be placed at flexible panel 302b instead of, or in addition to, being place at flexible panel 302n. For example, a force actuator 306 could be placed at flexible panel 302a while another force actuator 306 could be placed at flexible panel 302n. As noted with respect to loudspeaker 200, loudspeaker 300 may include one more signal generators to drive multiple force actuators 306.

Further, viscoelastic layers 314 may include multiple layers between each flexible panel 302. For example, two or more types of viscoelastic material 314 may be placed between flexible panel 302a and flexible panel 302b such that each of the types of viscoelastic material 314 covers all or substantially all of flexible panel 302a and flexible panel 302b. In this example, there may be more two or more types of viscoelastic material 314 that provide dampening of the vibrations of flexible panel 302a and/or flexible panel 302b.

Alternatively, two or more types of viscoelastic materials 314 may be placed between flexible panels 302. For example, one type of viscoelastic material 314 may be place between a first position of flexible panel 302a and a first position of flexible panel 302b, while another type of viscoelastic material 314 may be place between a second position of flexible panel 302a and a second position of flexible panel 302b. Additional types of viscoelastic material 314 may be placed at other positions between type of viscoelastic material 314 may be place between a first position of flexible panel 302a and a first position of flexible panel 302b. In this example, the multiple types of viscoelastic material 314 may together form the viscoelastic material layer 314a. The different types of viscoelastic materials 314 may be positioned to increase or reduce various qualities of the loudspeaker system 300.

The loudspeaker system 300 may also have multiple force actuators 304 that apply a force to the flexible panel 302a and/or flexible panel 302b. The force may be applied in a manner that causes the flexible panel 302a and/or flexible panel 302b to flex and/or vibrate, thereby producing sounds at various frequencies throughout the audible frequency bandwidth (20 Hz-20 kHz).

Figure 4:
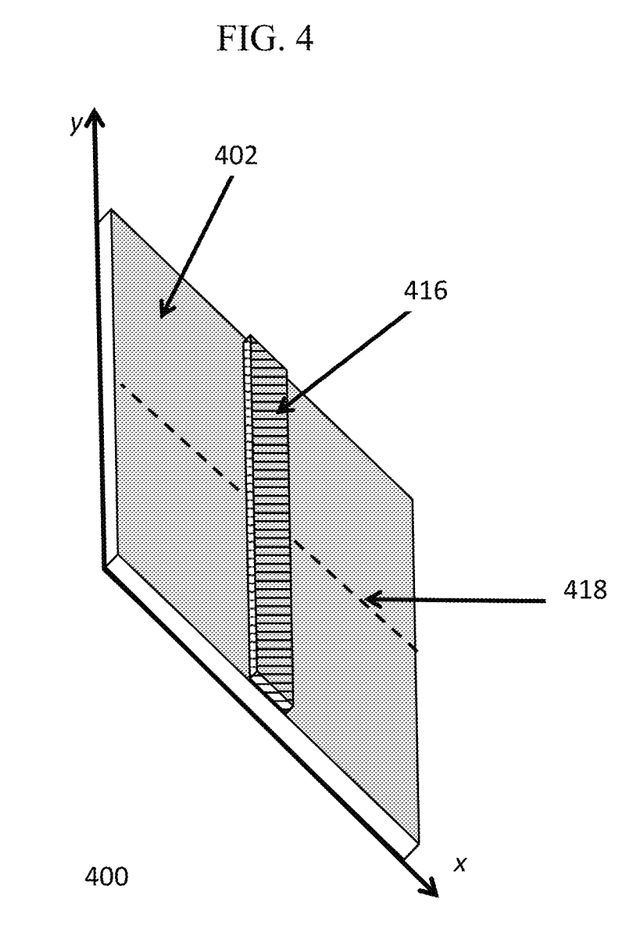
FIG. 4 is a panel loudspeaker system with a elastic panel and a constraining layer of viscoelastic material of the present application.

FIG. 4 is a panel loudspeaker system with an elastic panel and a constraining layer of viscoelastic material of the present application. As shown in FIG. 4, a flexible panel 402 may be partially covered by one or more constrained viscoelastic material layers 416 in a sub-region or sub-regions of the surface of the flexible panel 416. The size, shape, and position of these layers may be adjusted to tune the damping of specific modes, such as positioning constrained layers of viscoelastic material in regions of maximum curvature for a particular mode. The constrained layer of viscoelastic material may be positioned to dampen the vibrations of the bending mode 418, which has a horizontal nodal line halfway up the panel. Other positioning of one or more constrained viscoelastic layers 416 may also be used.

In another example, one or more constrained viscoelastic material layers 416 may be located in a sub-region or sub-regions of one surface of a flexible panel 416 in the configuration of loudspeaker 200 or loudspeaker 300. That is, using the loudspeaker 200 as an example, the one or more constrained viscoelastic material layers 416 may be located in a sub-region or sub-regions of one surface of a flexible panel 416, which in turn is affixed to another viscoelastic material, which in turn is affixed to another flexible panel. The constrained viscoelastic layers 416 may be of the same or different material as the viscoelastic material affixed to the other side of flexible panel 416.

Further, if multiple constrained viscoelastic material layers 416 are used, the viscoelastic materials 416 may be of different types. The use and positioning of different types of constrained viscoelastic material layers 416 may be varied to allow for control over the properties of loudspeaker 400.

Figure 5:
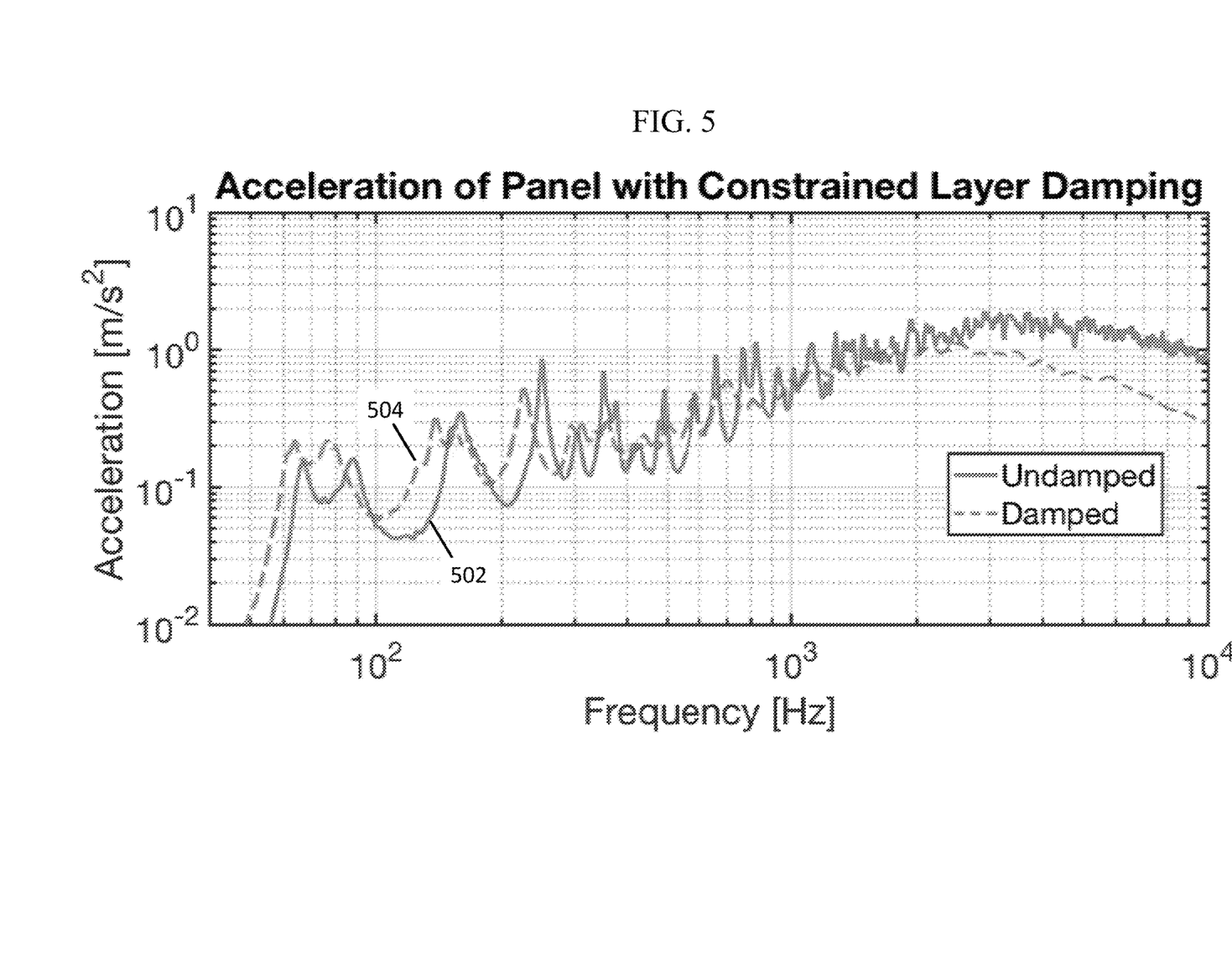
FIG. 5 is a comparison of the measured net acceleration of a panel integrated across the entire panel surface in a traditional flat panel loudspeaker and a panel loudspeaker according to the present application.

FIG. 5 is a comparison of the measured net acceleration of a panel integrated across the entire panel surface in a traditional flat panel loudspeaker, such as in FIG. 1 and a panel loudspeaker according to the present application, where a viscoelastic material with a thin aluminum backing on the back side of the panel that covers nearly 100% of the surface area of the original panel. The measured net acceleration of a panel integrated across the entire panel surface is plotted versus frequency. The total radiated sound pressure of the panel is in proportion to the net panel acceleration. The solid curve 502 is for the case of a traditional panel-form loudspeaker, and the dashed curve 504 is the same panel-form loudspeaker treated with constrained viscoelastic damping material. A number of sharp peaks and dips in the high-frequency response above 1 kHz are smoothed out when the panel is treated with constrained viscoelastic damping.

While various embodiments have been described above, it should be understood that such disclosures have been presented by way of example only and are not limiting. Thus, the breadth and scope of the subject compositions and methods should not be limited by any of the above-described exemplary embodiments, but should be defined only in accordance with the following claims and their equivalents. The contents of all references, including patent applications, such as U.S. application Ser. Nos. 15/255,366; 15/778,797; and U.S. Prov. App. Nos. 62/745,307; 62/745,324, cited throughout this application, as well as the Figures and Tables, are incorporated herein by reference.

Further, the loudspeakers described herein may be part of a system that upon which is implemented with various modes of using the loudspeaker. For example, the loudspeakers described herein may be used in connection with a mechanical coupling device for concentrating dynamic force transmitted from a dynamic force actuator to a panel, the device comprising: a base surface, wherein the base surface is a surface that is coupled to an active surface of a dynamic force actuator; a plateau on a reverse side of the device to the base surface, wherein the plateau has a top and sides, and wherein the top of the plateau is a concentrator surface that is coupled to a panel, and the sides of the plateau are a transition connecting the concentrator surface to an outer edge of the device on the reverse side of the device to the base surface; and wherein the concentrator surface is a continuous region with a surface area that may be smaller, larger, or the same surface area as a region of the base surface in contact with the dynamic force actuator, and wherein the concentrator surface transmits a dynamic force to a region of the panel coupled to the concentrator surface.

The mechanical coupling device may also comprise aluminum alloy, titanium, beryllium or other metals with a high speed of sound to ensure that all mechanical resonances of the device lie above the range of audible frequencies, wherein the mechanical resonances include longitudinal, bending and torsional waves.

The mechanical coupling device may also comprise composite materials including one or more selected from the group consisting of fiberglass, carbon fiber, and other composites with a high speed of sound to insure that all mechanical resonances of the element lie above the range of audible frequencies.

The mechanical coupling device may also comprise synthetic materials including one or more selected from the group consisting of acrylic, polyvinylchloride, and other synthetic materials with a high speed of sound to insure that all mechanical resonances of the element lie above the range of audible frequencies.

The mechanical coupling device may also have the one or more vent holes formed into the device to allow trapped air within the dynamic force actuator to escape.

The mechanical coupling device may also have the base surface being circular with a larger diameter than the concentrator surface.

The mechanical coupling device may also comprise wherein the transition is step-wise connecting the boundary to the concentrator surface by a step surface at 90 degrees to the boundary.

The mechanical coupling device may also comprise wherein the transition is a concave surface connecting the boundary to the concentrator surface.

The mechanical coupling device may also comprise wherein the transition is a tapered surface connecting the boundary to the concentrator surface.

The mechanical coupling device may also comprise wherein the concentrator surface is circular.

The mechanical coupling device may also comprise wherein the concentrator surface is square.

The mechanical coupling device may also comprise wherein concentrator surface is rectangular.

The mechanical coupling device may also comprise wherein the base surface and plateau of the device form together a polygonal shape.

The mechanical coupling device may also comprise wherein the base surface and plateau of the device form together an ellipsoidal shape.

The mechanical coupling device may also comprise wherein the base surface and plateau of the device form together a shape in which a surface having a greater surface area is coupled to the dynamic force actuator and a surface with a lesser surface area is coupled to the panel.

In another example, the loudspeakers described herein may be used in connection with a method of generating sound using the above described mechanical device comprising the steps of: interposing the device described above between an active surface of a dynamic force actuator and a panel; generating a dynamic force with the dynamic force actuator; transmitting the dynamic force through the device described above via the concentrator surface to the panel; generating sound from the panel through the action of the dynamic force transmitted by the device of described above.

The method may further comprise wherein the panel is a component of a flat panel loudspeaker.

The method may further comprise wherein the dynamic force actuator is a voice coil.

In another example, the loudspeakers described herein may be used in connection with a method of concentrating a dynamic force generated by a dynamic force actuator onto a flat panel, comprising the steps of: adhering the base surface of the device described above to an active surface of a dynamic force actuator; adhering the concentrator surface of the device described above to a panel; generating a dynamic force with the dynamic force actuator; transmitting the dynamic force through the device described above via the concentrator surface to the panel.

The method may further comprise wherein the adhering is performed by use of a glue.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims. The claims are intended to cover the components and steps in any sequence which is effective to meet the objectives there intended, unless the context specifically indicates the contrary.

What is claimed is:

1. A loudspeaker comprising: a first elastic panel; a second elastic panel; a first layer of a first viscoelastic material affixed between the first elastic panel and the second elastic panel to form a combined panel; and at least one force actuator located at a surface of the first elastic panel; and wherein, in response to an input signal, the at least one force actuator is driven to induce a bending motion in the combined panel to generate sound, wherein the viscoelastic material is positioned in a prescribed sub region of the first elastic panel to dampen the response of a specific bending mode of the combined panel.

2. The loudspeaker of claim 1, wherein the prescribed sub region is a region of high curvature for the specific bending mode to be damped.

3. The loudspeaker of claim 1, wherein the combined panel comprises N elastic panels and N−1 layers of viscoelastic materials, where N is a natural number, and wherein the N elastic panels and the N−1 layers are arranged to be alternating.

4. The loudspeaker of claim 1, wherein the first viscoelastic material is bonded to an entire surface of the first elastic panel and an entire surface of the second elastic panel.

5. The loudspeaker of claim 1, further comprising: a second layer of a second viscoelastic material; wherein the first layer of the first viscoelastic material is affixed between a first section of the first elastic panel and a first section of the second elastic panel, and the second layer of the second viscoelastic material is affixed between a second section of the first elastic panel and a second section of the second elastic panel.

6. The loudspeaker of claim 1, wherein an acoustic radiating surface of the first elastic panel is covered by a constrained viscoelastic material.

7. The loudspeaker of claim 1, wherein the first elastic panel and the second elastic panel each comprise a material selected from the group consisting of expanded polyvinyl chloride, glass, foam board, plastic, structural organic polymer, cardboard, wood, wood composite, aluminum, metal and alloy.

8. The loudspeaker of claim 1, wherein the viscoelastic material comprises an adhesive material with viscoelastic properties.

9. The loudspeaker of claim 1, wherein the at least one force actuator is formed of one of a crystalline piezoelectric material and an organic polymer piezoelectric material.

10. A method for using a loudspeaker comprising: applying an input signal to at least one force actuator affixed to a surface of a combined panel, the combined panel comprising: a first elastic panel; a second elastic panel; and a first layer of a first viscoelastic material affixed between the first elastic panel and the second elastic panel; wherein the at least one force actuator is located at a surface of the first elastic panel; and wherein, in response to an input signal, the at least one force actuator is driven to induce a bending motion in the combined panel to generate sound, wherein the viscoelastic material is positioned in a prescribed sub region of the first elastic panel to dampen the response of a specific bending mode of the combined panel.

11. The method of claim 10, wherein the prescribed sub region is a region of high curvature for the specific bending mode to be damped.

12. The method of claim 10, wherein the combined panel comprises N elastic panels and N−1 layers of viscoelastic materials, wherein N is a natural number, and wherein the N elastic panels and the N−1 layers are arranged to be alternating.

13. The method of claim 10, wherein the first viscoelastic material is bonded to an entire surface of the first elastic panel and an entire surface of the second elastic panel.

* * * * *